(12) United States Patent
Asatsuke et al.

(10) Patent No.: US 8,424,661 B2
(45) Date of Patent: Apr. 23, 2013

(54) POWER TRANSMITTING APPARATUS

(75) Inventors: Shouji Asatsuke, Hamamatsu (JP); Akio Oishi, Shizuoka (JP); Keiichi Ishikawa, Hamamatsu (JP)

(73) Assignee: Kabushiki Kaisha F.C.C, Shizuoka (JP)

( * ) Notice: Subject to any disclaimer, the term of this patent is extended or adjusted under 35 U.S.C. 154(b) by 0 days.

(21) Appl. No.: 13/368,228

(22) Filed: Feb. 7, 2012

(65) Prior Publication Data

US 2012/0199434 A1    Aug. 9, 2012

Related U.S. Application Data

(63) Continuation of application No. PCT/JP2011/063328, filed on Aug. 5, 2010.

(30) Foreign Application Priority Data

Aug. 7, 2009 (JP) .................................. 2009-184178

(51) Int. Cl.
    *F16D 25/10* (2006.01)
(52) U.S. Cl.
    USPC ................. 192/48.613; 192/48.611; 277/390; 277/515
(58) Field of Classification Search ........ 192/48.611–48.614, 48.618; 277/390, 277/515

See application file for complete search history.

(56) References Cited

U.S. PATENT DOCUMENTS

| | | | | | |
|---|---|---|---|---|---|
| 2,464,538 A | * | 3/1949 | Vanderzee | ............... | 192/48.613 |
| 3,199,648 A | * | 8/1965 | Schwab | .................... | 192/48.613 |
| 3,384,214 A | * | 5/1968 | Wilson | ..................... | 192/48.613 |
| 3,463,284 A | * | 8/1969 | Kampert | .................. | 192/48.611 |
| 4,947,974 A | * | 8/1990 | Smemo et al. | ........... | 192/48.611 |
| 5,505,287 A | * | 4/1996 | Asatsuke et al. | ........... | 192/85.01 |

FOREIGN PATENT DOCUMENTS

| | | |
|---|---|---|
| JP | 40-28721 | 12/1965 |
| JP | 52-64253 | 5/1977 |
| JP | 61-157727 | 9/1986 |
| JP | 02-017228 | 1/1990 |
| JP | 3-84433 | 8/1991 |
| JP | 08-061396 | 3/1996 |

OTHER PUBLICATIONS

International Search for PCT/JP2010/063328 date of completion Nov. 9, 2010.

* cited by examiner

*Primary Examiner* — Richard M. Lorence
(74) *Attorney, Agent, or Firm* — Knobbe, Martens, Olson & Bear LLP

(57) ABSTRACT

A power transmitting apparatus can comprise a plurality of gear stage clutches arranged on the way of a power transmitting path between an engine and the wheels. Each of the gear stage clutches include alternately arranged driving clutch discs and driven clutch discs, hydraulic pistons actuated by hydraulic oil to selectively engage or disengage the driving clutch discs and driven clutch discs, hydraulic chambers for actuating the hydraulic pistons, and supplying ports communicating with oil passages formed within the input shaft and opening on the side surface of the input shaft for supplying the hydraulic chambers with hydraulic oil from the oil passages to actuate the hydraulic pistons. A plurality of the supplying ports can be formed on a same plane of a radial cross-section of the input shaft.

9 Claims, 12 Drawing Sheets

(a)

(b)

(a)

(b)

POWER TRANSMITTING APPARATUS

CROSS-REFERENCE TO RELATED APPLICATIONS

This application is a continuation of PCT Application No. PCT/JP2010/063328 filed on Aug. 5, 2010, which claims priority to Japanese Application No. 2009-184178, filed on Aug. 7, 2009, the entire contents of each of which are hereby incorporated by reference.

BACKGROUND OF THE INVENTIONS

Field of the Inventions

The present inventions relate to power transmitting apparatuses having gear stage clutches for engaging corresponding gears with different gear ratios for transmitting the driving power of an engine to wheels, including hydraulically controlled clutches that can engage and disengage arbitrary gear stages.

There are generally two types of transmissions for selectively transmitting or cutting-off driving power of an engine to wheels of vehicle; manual transmissions (MT) in which speed shifting operations are manually carried out and automatic transmissions (AT) including torque converters and in which shifting operation are automatically carried out. Although known AT systems easily perform speed shifting operations, they have a disadvantage in power transmitting efficiency. Accordingly, Automatic-Manual Transmissions (AMT) have been proposed for automatically performing speed shift operations without using the torque converter.

Such an AMT type power transmitting apparatus can comprise a start speed change clutch for transmitting or cutting off the power transmitting path between an engine and wheels, and a plurality of gear stage clutches, each of which have preset gear ratios. The gear stage clutch can comprise a synchronizing mechanism and a dog clutch and is formed so that the gear ratio during power transmission from an engine to wheels can be arbitrarily set by selectively connecting the dog clutch to any one of the gear stage clutches.

However, there is a problem that the shift time (lag) can become larger in the prior art power transmitting apparatus described above, since the gear ratio is set by selecting an arbitrary gear stage clutch (which includes a synchronizing mechanism and a dog clutch). Accordingly, the applicant of the present Application has devised a power transmitting apparatus comprising driving clutch discs and driven clutch discs alternately arranged with each other, and a hydraulic piston for selectively actuating the driving clutch discs and driven clutch discs to engage and disengage them so that a driving power can be transmitted, at a predetermined gear ratio, when the driving clutch discs and driven clutch discs are engaged.

For example, the above noted problem can occur in a system such as that illustrated in FIG. 15. As shown in FIG. 15, gear stage clutches 106, 107 have different gear ratios (i.e. the output gears Ga, Gb have different diameters) and are arranged side by side each other. A hydraulic piston 105 is arranged between the gear stage clutches 106, 107 of a clutch mechanism 104. The engagement of driving clutch discs and driven clutch discs of the gear stage clutch 106 can be achieved by supplying an oil passage 101a, formed within an input shaft 100 and leading the hydraulic oil to a hydraulic chamber S2 through a supplying port 102, with hydraulic oil to move the hydraulic piston 105 toward the left (as viewed in FIG. 15).

On the other hand, the engagement of driving clutch discs and driven clutch discs of the gear stage clutch 107 can be achieved by supplying an oil passage 101b formed within an input shaft 100 and leading the hydraulic oil to a hydraulic chamber S1 through a supplying port 103, with hydraulic oil to move the hydraulic piston 105 toward the right (as viewed in FIG. 15). Since such a structure is not a known invention disclosed in any document, there is no document information of the prior art to be mentioned here.

SUMMARY OF THE INVENTIONS

An aspect of at least one of the inventions disclosed herein includes the realization that, in the power transmitting apparatus described above, since two supplying ports 102, 103 are formed on the input shaft 100 at longitudinally different positions as shown in FIG. 16, it is required to arrange three sealing members R such as O-rings at longitudinally different positions. This causes a problem of increasing the longitudinal dimension of the power transmitting apparatus. In addition, the provision of a spline 100a for connecting the input shaft 100 and the gear stage clutch means 106, 107 on the input shaft 100 at a longitudinally different position from the sealing members R also increases the longitudinal dimension of the power transmitting apparatus.

It is therefore an object of at least one of the present inventions to provide a power transmitting apparatus which can improve its power transmitting efficiency, reducing the speed shift time lag, as well as reducing the longitudinal dimension of the input shaft and thus a whole longitudinal dimension of the power transmitting apparatus.

Thus, in accordance with an embodiment, a power transmitting apparatus can comprise a power transmitting apparatus including a plurality of gear stage clutches forming at least part of a power transmitting path between an engine and wheels of a vehicle, an input from an input shaft of an engine side and an output to a wheel side of the gear stage clutches being set at predetermined gear ratios. A gear stage selecting device can be configured to select any one of the gear stage clutches in accordance with a running condition of a vehicle and to arbitrarily set the gear ratio during power transmission from the engine to the wheels. Each of said gear stage clutches comprises alternately arranged driving clutch discs and driven clutch discs, a hydraulic piston actuated by hydraulic oil to selectively engage or disengage the driving clutch discs and driven clutch discs, hydraulic chambers for actuating the hydraulic pistons, and supplying ports communicating with oil passages formed within the input shaft and opening on a side surface of the input shaft for supplying the hydraulic chambers with hydraulic oil from the oil passages to actuate the hydraulic pistons. Power can be transmitted at a predetermined gear ratio by engaging the driving clutch discs with driven clutch discs of the gear stage clutch of an arbitrary gear stage by selectively supplying hydraulic oil to the hydraulic chambers. A plurality of the supplying ports are formed on a same plane of a radial cross-section of the input shaft.

As such, since the gear stage clutches comprise alternately arranged driving clutch discs and driven clutch discs, and a hydraulic piston actuated by hydraulic oil to selectively engage or disengage the driving clutch discs and driven clutch discs, and since it is structured so that the power can be transmitted at a predetermined gear ratio with engaging the driving clutch discs with driven clutch discs, it is possible to improve the power transmitting efficiency and to reduce the speed shift time lag. In addition, since a plurality of the supplying ports are formed on a same plane of a radial cross-section of the input shaft, it is possible to reduce the longitudinal dimension of the input shaft and thus the whole longitudinal dimension of the power transmitting apparatus.

In some embodiments, an annular sealing member is arranged around each of the supplying ports formed on the outer circumferential surface of the input shaft so as to enclose and seal the supplying ports. As such, since an annular sealing member is arranged around each of the supplying ports formed on the outer circumferential surface of the input shaft so as to enclose and seal the supplying ports, it is possible to easily form a plurality of the supplying ports on a same plane of a radial cross-section of the input shaft and also to independently seal the each supplying ports.

Additionally, in some embodiments, the sealing member is preformed to have a bent configuration so that it corresponds to the radius of curvature of the outer circumferential surface of the input shaft. As such, since the sealing member is previously formed to have a bent configuration so that it corresponds to the radius of curvature of the outer circumferential surface of the input shaft, it is possible to further surely seal the supplying ports.

In some embodiments, one sealing member arranged around one of the supplying ports for sealing it and the other sealing member arranged around the other of the supplying ports for sealing it, both supplying ports being formed on a same plane of a radial cross-section of the input shaft, are connected each other. As such, since one sealing member arranged around one of the supplying ports for sealing it and the other sealing member arranged around the other of the supplying ports for sealing it, both supplying ports being formed on a same plane of a radial cross-section of the input shaft, are connected each other, it is possible to reduce the number of parts and thus to improve the workability of mounting the sealing member to the input shaft.

Further, in some embodiments, a portion on the outer circumferential surface of the input shaft including the supplying ports is formed with a spline mating with a spline of the gear stage clutch means for rotating together with the gear stage clutch means. As such, since the portion on the outer circumferential surface of the input shaft including said supplying ports is formed with a spline mating with a spline of the gear stage clutch means for rotating together with the gear stage clutch means, it is possible to further reduce the longitudinal dimension of the power transmitting apparatus as compared with a power transmitting apparatus in which the spline is formed on a portion not including the supplying port.

In some embodiments, the gear stage clutches having different gear ratios are arranged side by side each other and actuated in common by the hydraulic piston so that the driving clutch discs and the driven clutch discs of the gear stage clutch means of a desired gear ratio are selectively engaged by the hydraulic piston. As such, since the gear stage clutches of different gear ratios are arranged side by side each other and actuated in common by the hydraulic piston so that the driving clutch discs and the driven clutch discs of the gear stage clutch of a desired gear ratio are selectively engaged by the hydraulic piston, it is possible to further reduce the longitudinal dimension of the power transmitting apparatus as compared with a power transmitting apparatus in which the hydraulic piston is not used in common both to the gear stage clutch means of different gear ratios.

In some embodiments, the gear stage clutches of different gear ratios are arranged side by side each other, wherein cancelling chambers are formed oppositely to the hydraulic chambers of the hydraulic pistons for disengaging the hydraulic pistons by hydraulic oil, and wherein the supplying ports communicate both with the hydraulic chamber of one of the gear stage clutch means and the cancelling chamber of the other of the gear stage clutch means. As such, since the gear stage clutches of different gear ratios are arranged side by side each other, cancelling chambers are formed oppositely to the hydraulic chambers of the hydraulic pistons for disengaging the hydraulic pistons by hydraulic oil, and the supplying ports communicate both with the hydraulic chamber of one of the gear stage clutches and the cancelling chamber of the other of the gear stage clutch, it is possible to eliminate return springs for returning the hydraulic piston or to use return springs of a smaller spring force.

BRIEF DESCRIPTION OF THE DRAWINGS

Additional advantages and features of the present inventions will become apparent from the subsequent description and the appended claims, taken in conjunction with the accompanying drawings, wherein:

DETAILED DESCRIPTION OF PREFERRED EMBODIMENTS

Preferable embodiments of the present invention are described below with reference to accompanied drawings.

Figure 1:
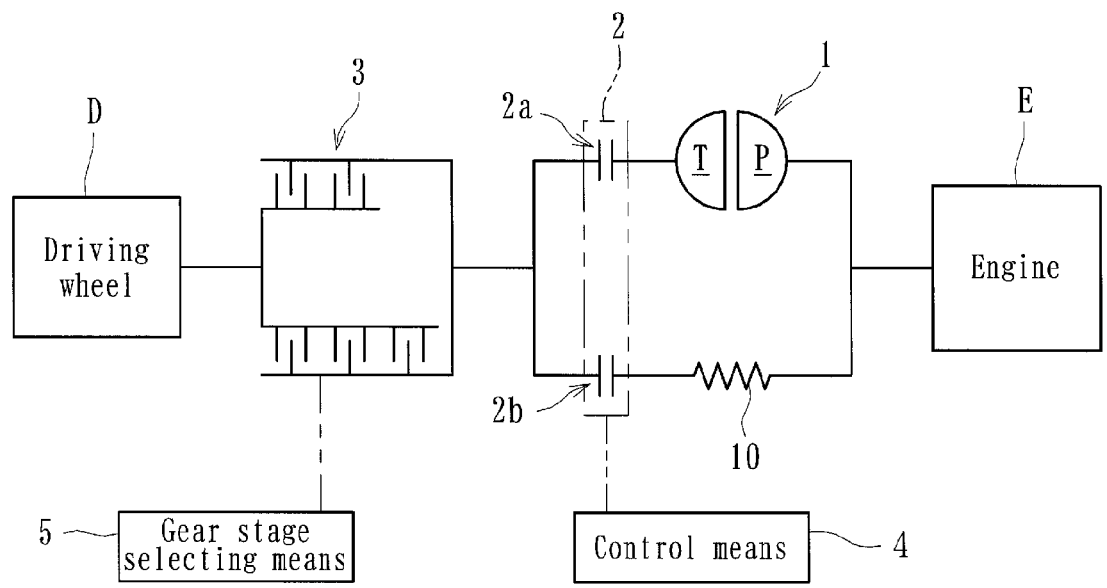
FIG. 1 is a schematic diagram showing the connections of the engine, power transmitting apparatus, and wheels of a vehicle according to a first embodiment.
Figure 2:
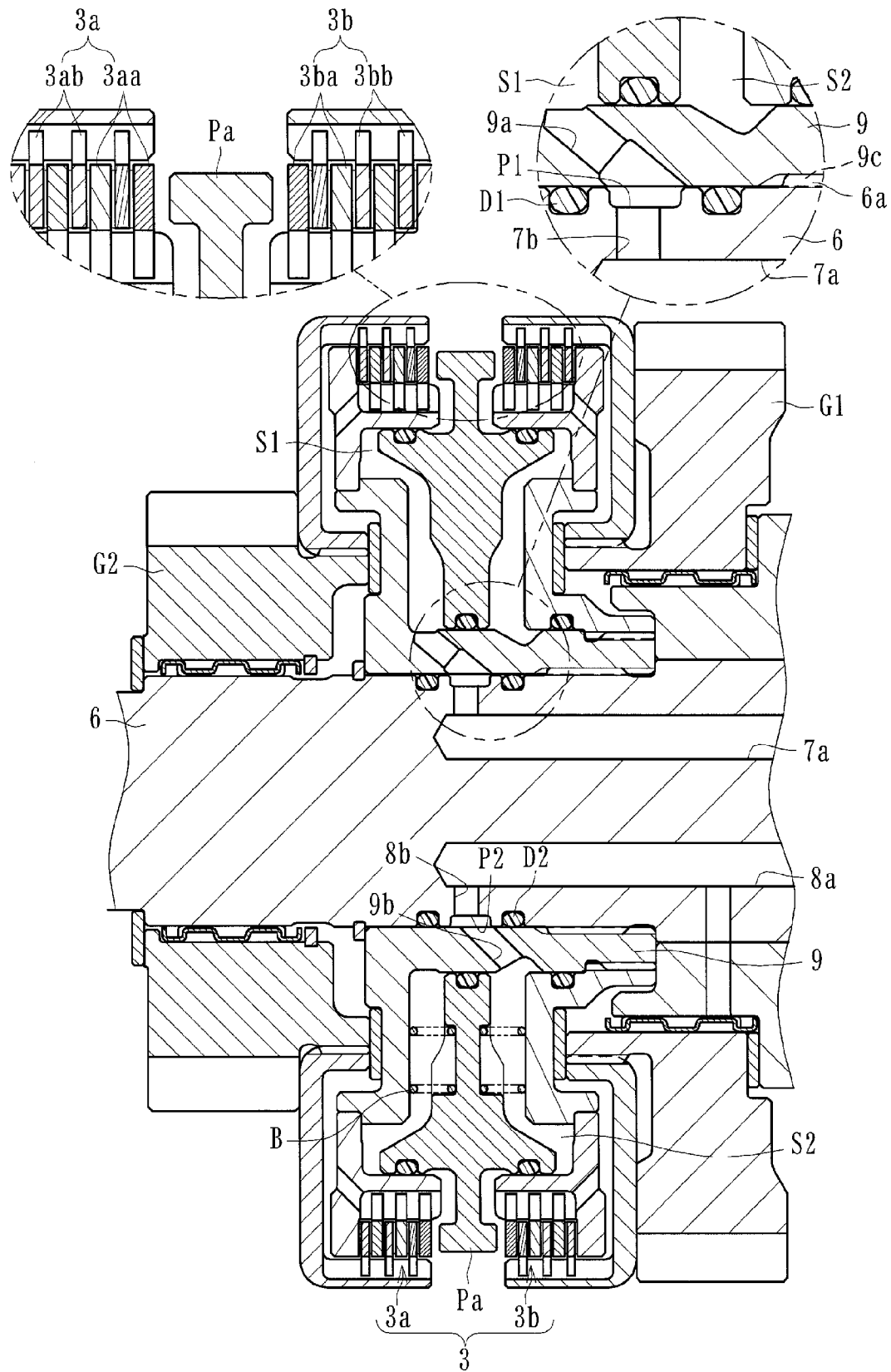
FIG. 2 is a longitudinal sectional view showing two gear set clutches of the power transmitting apparatus according to the first embodiment.

The power transmitting apparatus of a first embodiment is configured to transmit or cut off the driving power of an engine (driving source) of an automobile (vehicle) to the wheels (driving wheels). The illustrated embodiment includes, as shown in FIGS. 1 and 2, a torque converter 1, a start speed change clutch 2, a plurality of gear stage clutches 3, a control device 4, and a gear stage selecting device 5. As shown in FIG. 1, the torque converter 1, the start speed change clutch 2 and the gear stage clutch 3 are arranged on the way of a power transmitting path from the engine E, which serves as a driving source of a vehicle, to wheels of the vehicle (driving wheels D).

The torque converter 1, as is well known in the art of torque converters and automatic transmission in general, has a torque amplifying function for amplifying the torque from the engine E and transmitting it to the driving wheels D. The torque converter 1 includes a torque converter cover (not shown) rotated around its shaft by the driving force transmitted from the engine E and contains in a fluid-tight manner, liquid (operating oil). The torque converter 1 also includes a pump P formed on the side of the torque converter cover, and a turbine T arranged oppositely to the pump P and rotatable at the side of the torque converter cover.

When the torque converter cover and the pump P are rotated by the driving force of the engine E, the rotational torque is transmitted to the turbine T through the liquid (operating oil) with the torque being amplified. When the turbine T is then rotated by the amplified torque, a predetermined driving shaft (a first driving shaft) spline-fitted with the turbine T is rotated and thus the amplified torque is transmitted to the driving wheels D via the gear stage clutch 3. Thus the power transmitting apparatus has a driving power transmitting path (a power transmitting path of torque converter) comprising the torque converter cover, the pump P and the turbine T.

On the other hand the torque converter cover is connected to a predetermined connecting member (not shown) through the damper mechanism 10 comprising coil springs and the connecting member is further fitted with a predetermined driving shaft (second driving shaft) via an input shaft 6. Accordingly, the torque converter cover, the connecting member and the second driving shaft are rotated by the driving power of the engine E, and thus the driving torque of the engine E is also transmitted to the gear stage clutch 3. That is, the second driving shaft can transmit the driving power of the engine E to the driving wheels D without passing through the power transmitting path of the torque converter 1.

As described above, the first driving shaft can be rotated by the driving power of the engine E via the power transmitting path of the torque converter 1 and is connected to the first clutch 2a of the start speed change clutch 2. Additionally, the second driving shaft can be directly rotated by the driving power of the engine E without passing through the power transmitting path of the torque converter 1 and can be connected to the second clutch 2b of the start speed change clutch 2.

The start speed change clutch 2 is configured to transmit or cut off the driving power of the engine E to the driving wheels D at an arbitrary timing. The start speed change clutch 2 can comprise the first clutch 2a for transmitting the driving power of the engine E to the driving wheels D through the power transmitting path of the torque converter 1 and a second clutch 2b for transmitting the driving power of the engine E to the driving wheels D without through the power transmitting path of the torque converter 1. The first and second clutch 2a, 2b can be formed by multiple disc clutches.

The control device 4 can be configured to control the hydraulic oil pressure supplied to each gear stage clutch 3 and can also be configured to selectively operate the first and second clutch 2a, 2b in accordance with conditions of vehicle. Similarly to the gear stage selecting device 5 described below, the control device 4 can be formed for example, by a microcomputer supported by a vehicle.

A plurality of the gear stage clutches 3 can be arranged between the start speed change clutch 2 and the driving wheels D on the way of the power transmitting path and its input (rotational speed of the start speed change clutch means) and output (rotational speed of the driving wheels) are set at predetermined ratios. In the illustrated embodiment two gear stage clutches 3a, 3b are shown. However, three or more gear stage clutches can be used. For example, eight gear stage clutches corresponding to eight gear ratios (1-7 forward speeds and one reverse speed) can be used.

More particularly, gear stage clutches 3a, 3b are arranged side by side longitudinally along the input shaft 6 as shown in FIG. 2. The gear stage clutch 3a comprises alternately arranged driving clutch discs 3aa and driven clutch discs 3ab, a hydraulic piston Pa driven by hydraulic pressure for selectively engage or disengage the driving clutch discs 3aa and driven clutch discs 3ab, and a hydraulic chamber S1 for actuating the hydraulic piston Pa and is configured so that the driving power can be transmitted to the output shaft (a shaft formed with a gear mating with a gear G2 and connected to the driving wheels D; not shown) via a gear G2 when the driving clutch disc 3aa and the driven clutch disc 3ab are engaged.

On the other hand the gear stage clutch 3b comprises alternately arranged driving clutch discs 3ba and driven clutch discs 3bb, a hydraulic piston Pa driven by hydraulic pressure for selectively engage or disengage the driving clutch discs 3ba, and a hydraulic chamber S2 for actuating the hydraulic piston Pa and is configured so that the driving power can be transmitted to the output shaft (a shaft formed with a gear mating with a gear G1 and connected to the driving wheels D; not shown) via a gear G1 when the driving clutch discs 3ba and the driven clutch discs 3bb are engaged.

That is, the hydraulic piston Pa is used in common both with the gear stage clutch 3a and the gear stage clutch 3b and can be moved toward the left in FIG. 2 by introducing the hydraulic oil to the hydraulic chamber S2 so that the tip end of the hydraulic piston Pa urges the gear stage clutch 3a to engage the driving clutch discs 3aa and the driven clutch discs 3ab. Thus the driving power of the engine E is transmitted to the output shaft via the gear G2 and accordingly the driving power can be transmitted at a gear ratio corresponding to the diameter of the gear G2. On the other hand, the hydraulic piston Pa can be moved toward the right in FIG. 2 by introducing the hydraulic oil to the hydraulic chamber S1 so that the tip end of the hydraulic piston Pa urges the gear stage clutch 3b to engage the driving clutch discs 3ba and the driven clutch discs 3bb. Thus the driving power of the engine E is transmitted to the output shaft via the gear G1 and accordingly the driving power can be transmitted at a gear ratio corresponding to the diameter of the gear G1.

When supply of the hydraulic oil to the hydraulic chamber S1, S2 is stopped, the hydraulic pressure is released and thus the hydraulic piston Pa can be returned to the initial position (neutral position) by an urging force of a return spring B. When the hydraulic piston Pa is returned to the initial position, the driving clutch discs 3aa, 3ba and the driven clutch discs 3*ab*, 3*bb* are disengaged and thus transmission of the driving power is cut off. The term "disengage" used herein means a condition released from a pressure applied to the clutch discs and thus it is not limited only to a physically separated condition.

Accordingly, when the hydraulic oil is selectively introduced either to the hydraulic chamber S1 or to the hydraulic chamber S2, the hydraulic piston Pa can be selectively moved either to the left or to the right and thus the gear stage clutch 3*a* or 3*b* can be selectively actuated. Since the gear stage clutch 3*a*, 3*b* are structured so that they have different gear ratios in accordance with the actuated direction of the hydraulic piston Pa, the hydraulic piston Pa can be in common both with the gear stage clutch 3*a*, 3*b*. This makes it possible to reduce the size (especially a size in longitudinal direction) of the power transmitting apparatus and also to reduce the number of structural parts and accordingly the manufacturing cost of the power transmitting apparatus.

An interlocking member i.e. hub 9 forming part (i.e. a common portion of the gear stage clutch 3*a*, 3*b*) of the gear stage clutch 3 can be mounted on the input shaft 6 so as to be rotated together with the interlocking member 9. That is, the outer circumferential surface of the input shaft 6 is formed with a spline 6*a* (FIG. 3) and the inner circumferential surface of the interlocking member 9 is also formed with a spline 9*c* (FIG. 2) mating with the spline 6*a* of the input shaft 6.

Figure 4:
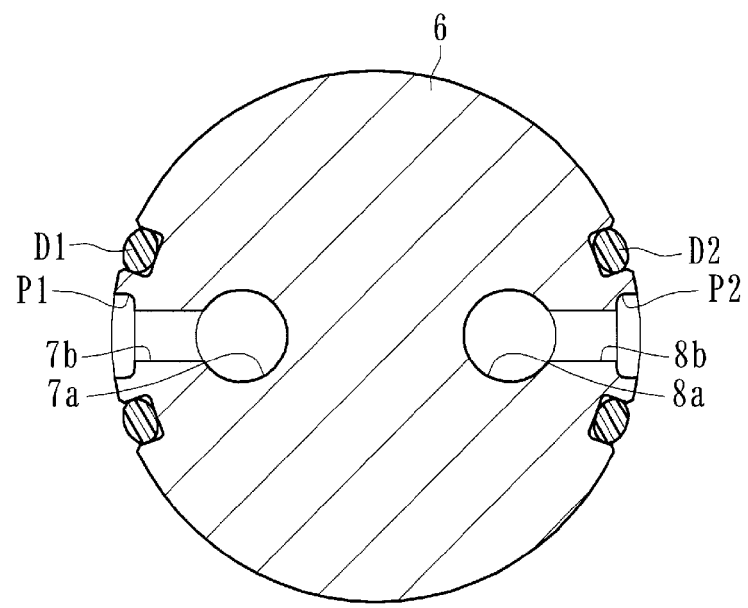
FIG. 4 is a cross-sectional view taken along a line IV-IV of FIG. 3.

Further, supplying ports P1, P2 are formed on the side surface of the input shaft 6. The supplying ports P1, P2 communicate both with oil passages (7*a*, 7*b*), (8*a*, 8*b*) and with oil passages 9*a*, 9*b* formed in the interlocking member 9 to supply the hydraulic chambers S1, S2 with hydraulic oil from the oil passages (7*a*, 7*b*), (8*a*, 8*b*) and thus to actuate the hydraulic piston Pa. That is, the oil passages 7*a*, 8*a* communicating with a hydraulic oil source (not shown) extend within the input shaft 6 substantially in parallel therewith as shown in FIG. 4. The oil passages 7*b*, 8*b* radially extend respectively from the oil passages 7*a*, 8*a* and the supplying ports P1, P2 are opened on the outer circumferential surface of the input shaft 6 at the tip end of the oil passages 7*b*, 8*b* to communicate with the oil passages 9*a*, 9*b*.

As shown in FIG. 4, a plurality of the supplying ports (ports P1, P2 in the illustrated embodiment of FIG. 4) are formed on a same plane of a radial cross-section (i.e. a plane sectioned on the same diameter) of the input shaft 6. Thus the supplying port P1 is communicated with the hydraulic chamber S1 via the inclined oil passage 9*a* formed in the interlocking member 9 and similarly the supplying port P2 is communicated with the hydraulic chamber S2 via the inclined oil passage 9*b* formed in the interlocking member 9.

Although it is shown in FIG. 4 that the oil passages 7*b*, 8*b* are positioned on the same diameter, they may be positioned in different directions not on the same diameter. However it is necessary in this case that the supplying ports P1, P2 formed in the oil passages 7*b*, 8*b* are communicated with the oil passages 9*a*, 9*b* in the interlocking member 9.

Figure 3:
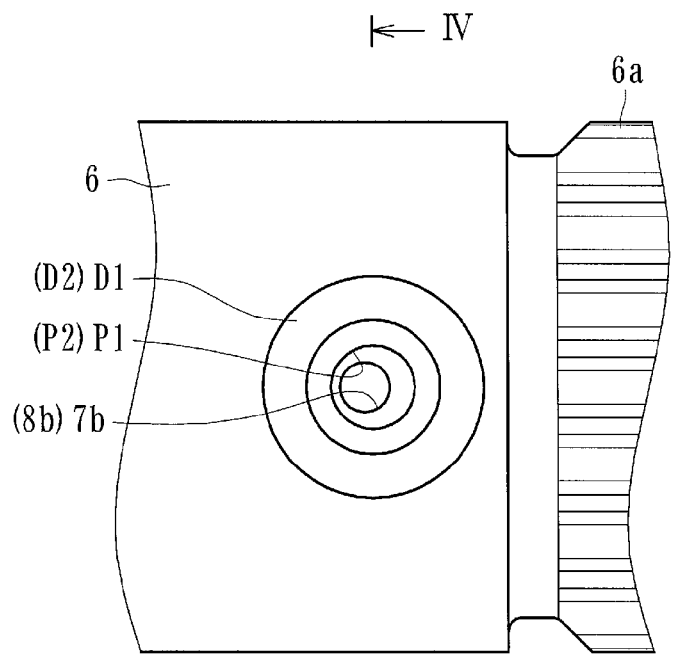
FIG. 3 is an enlarged view showing a portion near the supplying port of the input shaft of the power transmitting apparatus of FIG. 1.

Additionally, annular sealing members D1, D2 are arranged respectively around the supplying ports P1, P2 formed on the outer circumferential surface of the input shaft 6 so as to enclose and seal the supplying ports P1, P2 as shown in FIGS. 3 and 4. The provision of these sealing members D1, D2 enables independent sealing of the supplying ports P1, P2 and easier positioning of a plurality of the supplying ports on the same plane of a radial cross-section of the input shaft 6. Although it is shown that each of the sealing member D1, D2 has an annular configuration, any other configuration e.g. an elliptic or rectangular configuration can also be used.

Figure 5:
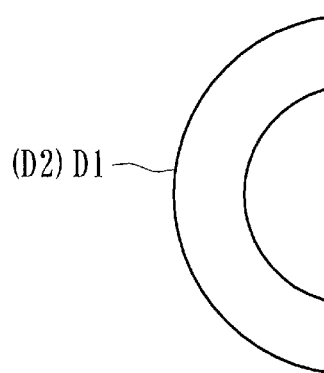
FIG. 5 is (a) a front elevation view showing a sealing member of the power transmitting apparatus of FIG. 1, and (b) a side elevation view thereof.
Figure 5:
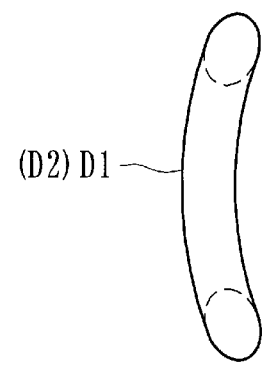
Figure 6:
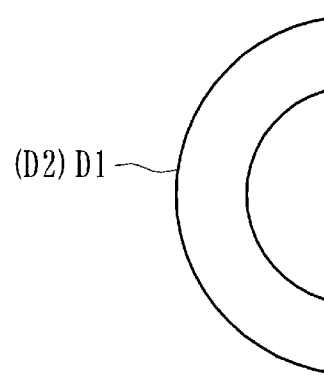
FIG. 6 is (a) a front elevation view showing other configuration of a sealing member of power transmitting apparatus of FIG. 1, and (b) a side elevation view thereof.
Figure 6:
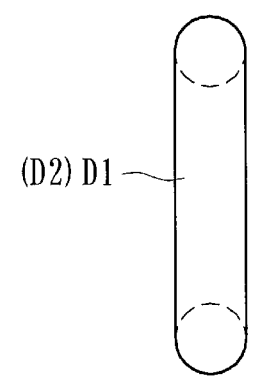

The sealing members D1, D2 can be made of materials having sealability e.g. such as soft metals, plastics or rubber etc. and preferably pre-bent as having a curvature corresponding to that of the outer circumferential surface of the input shaft 6 as shown in FIG. 5. Such a pre-bent sealing members D1, D2 can achieve more reliable sealing of the supplying ports P1, P2. If the sealing members are made of flexible material, sealing members D1, D2 having a straight configuration in the side view of FIG. 6 can be applied with being deformed along the outer circumferential surface of the input shaft 6.

Figure 7:
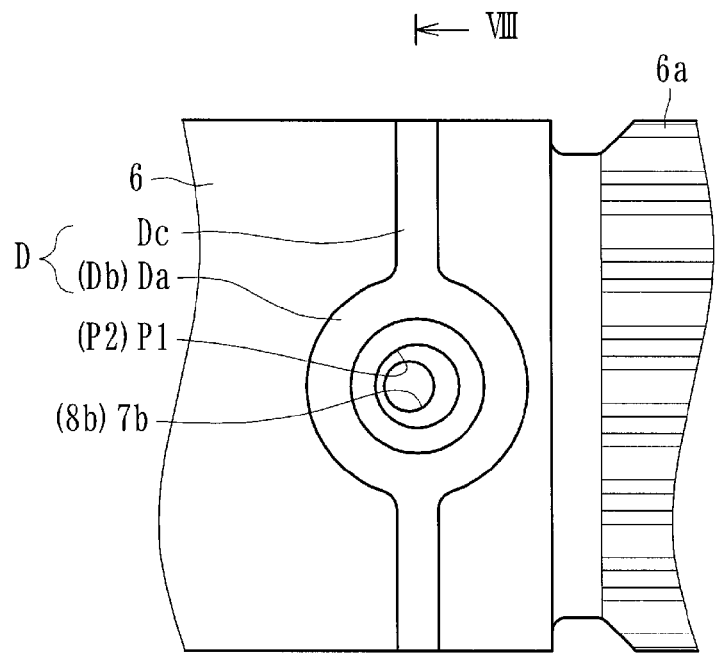
FIG. 7 is an enlarged view showing a portion near the supplying port of the input shaft on which other configuration of a sealing member is mounted.
Figure 8:
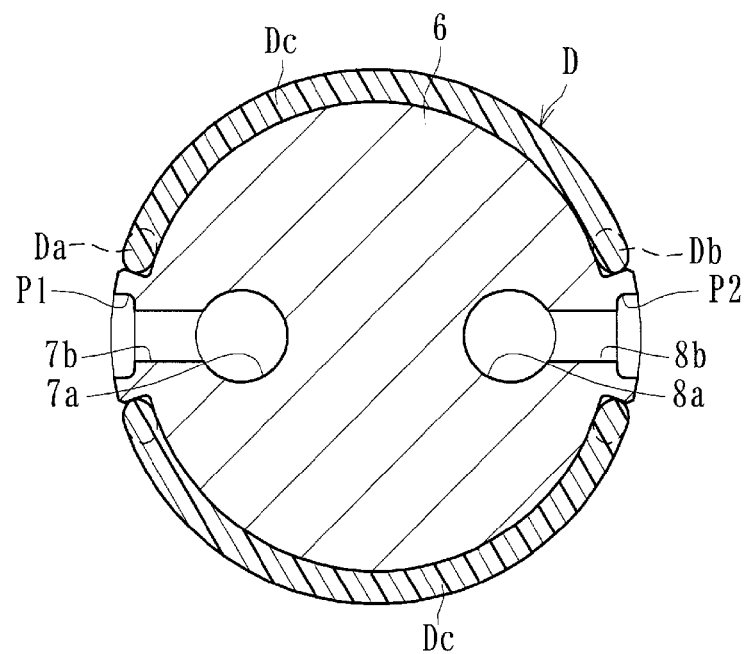
FIG. 8 is a cross-sectional view taken along a line VIII-VIII of FIG. 7.
Figure 9:
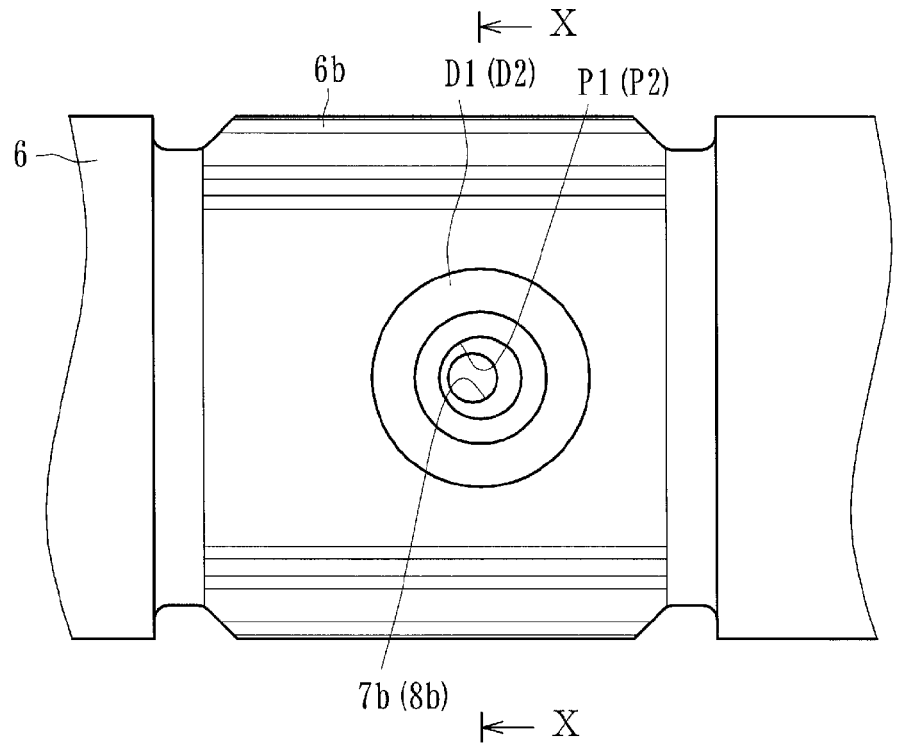
FIG. 9 is an enlarged view showing a portion near the supplying port of the input shaft of the power transmitting apparatus of a second embodiment.

In addition, as shown in FIGS. 7 and 8, it is possible to form a sealing member D comprising one sealing member Da and the other sealing member Db connected by a connecting portion Dc. For example, the sealing member Da can be arranged around one of the supplying ports P1 or P2 and the other sealing member Db can be arranged around the other of the supplying ports P2 or P1, both supplying ports P1, P2 being formed on a same plane of a radial cross-section of the input shaft 6, and are connected each other by a connecting portion Dc. The connecting portion Dc can be made of a pair of band shaped members connecting the supplying ports Da, Db. However, the connecting portion Dc can be made of any material or in any configuration. For example, the material of the connecting portion Dc may be different from the sealing members Da, Db such as, but without limitation, materials having no sealability or elasticity.

Since one sealing member Da arranged around one supplying port P1 and the other sealing member Db arranged around the other supplying port P2 are connected each other, it is possible to reduce the number of parts and thus to improve the workability of mounting the sealing member to the input shaft 6.

The gear stage selecting device 5 can be configured to control the hydraulic oil pressure supplied to each gear stage clutch 3 and can also be configured to select either one of the gear stage clutch 3 (gear stage clutch 3*a*, 3*b* in the illustrated embodiment) in accordance with running conditions of vehicle and to arbitrarily set the gear ratio in power transmission from an engine to driving wheels. In some embodiments, the gear stage selecting device 5 can comprise a microcomputer supported on a vehicle. Accordingly, the control device 4 and the gear stage selecting device 5 can selectively actuate the start speed change clutch 2 and the gear stage clutch 3 in accordance with the pre-set modes.

Figure 11:
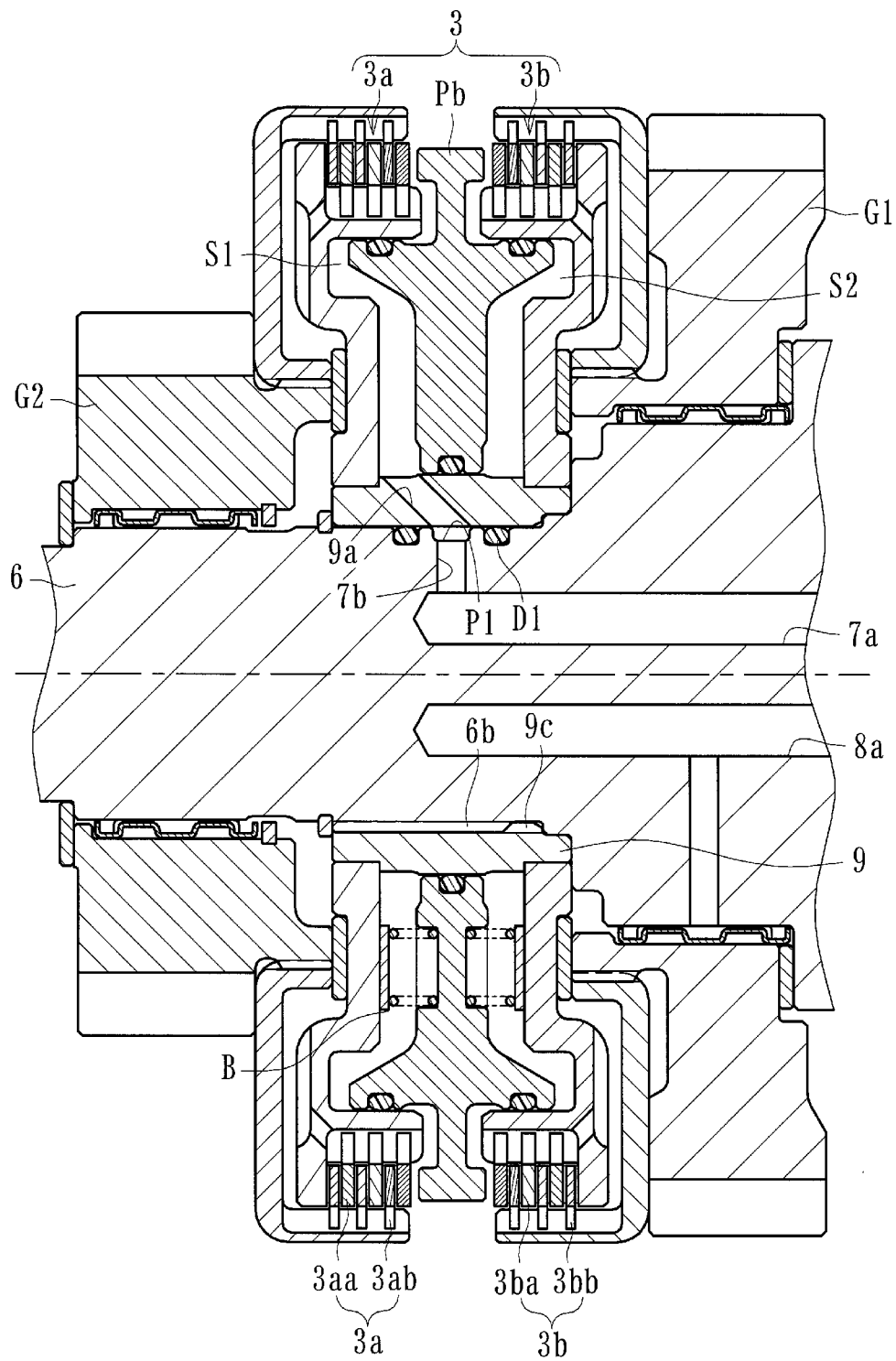
FIG. 11 is a longitudinal section view showing the power transmitting apparatus according to a second embodiment (an upper half is a longitudinal section view of a portion including a supplying port and a lower half is a longitudinal section view of a portion including a spline)

Similarly to the first embodiment, a second embodiment of the power transmitting apparatus can be configured to transmit or cut off the driving power of an engine (driving source) of an automobile (vehicle) to the wheels (driving wheels). In the illustrated embodiment, the second embodiment can comprise, as shown in FIGS. 1 and 11, the torque converter 1, the start speed change clutch 2, a plurality of gear stage clutches 3, the control device 4, and the gear stage selecting device 5. The structural elements as those of the first embodiment are designated by same reference numerals as those used in the first embodiment and thus description of them will be omitted.

Figure 10:
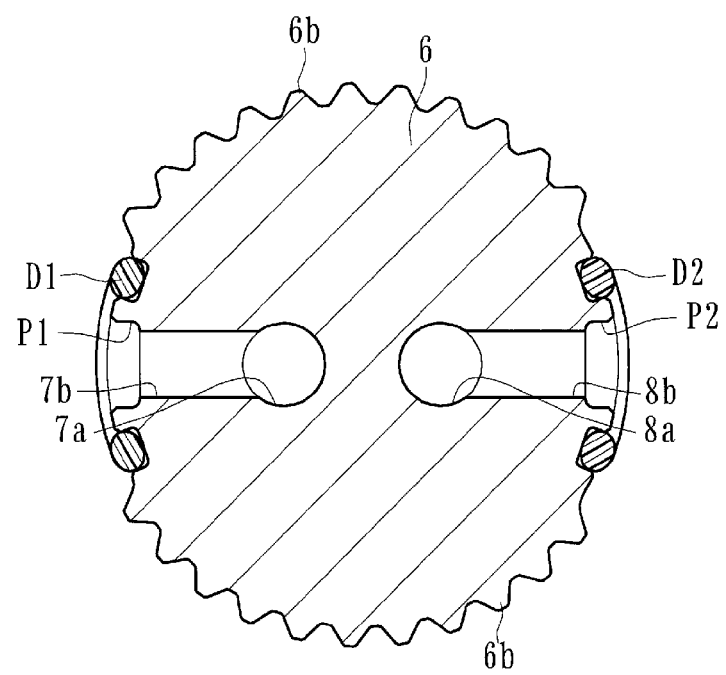
FIG. 10 is a cross-sectional view taken along a line X-X of FIG. 9.

Similarly to the first embodiment, in this embodiment a plurality of the supplying ports (supplying ports P1, P2) are formed on a same plane of a radial cross-section (a plane sectioned on the same diameter) of the input shaft 6 and annular sealing members D1, D2 are arranged respectively around the supplying ports P1, P2 formed on the outer circumferential surface of the input shaft 6 so as to enclose and seal the supplying ports P1, P2 (FIGS. 10 and 11). For convenience of explanation, the upper half of FIG. 11 shows a cross-section of part in which the supplying port P1 is formed and its lower half shows part in which splines 6b, 9c are formed. Since the annular sealing members D1, D2 are arranged respectively around the supplying ports P1, P2 formed on the outer circumferential surface of the input shaft 6 so as to enclose and seal the supplying ports P1, P2, it is possible to easily form a plurality of the supplying ports P1, P2 on a same plane of a radial cross-section of the input shaft 6 and also to independently seal the supplying ports P1, P2.

According to the second embodiment, a spline 6b can be formed on a predetermined part including the supplying ports P1, P2 on the outer circumferential surface of the input shaft 6 for mating with the spline 9c of the interlocking member 9 forming the gear stage clutch 3. This makes it possible to further reduce the longitudinal dimension of the power transmitting apparatus as compared with the structure of the first embodiment in which the spline 6b is formed in a region in which the supplying ports P1, P2 are not included.

In the power transmitting apparatus of the second embodiment, no spline 6b is formed in a longitudinal direction from the position in which the supplying ports P1, P2 are formed. This makes it easier to manufacture the input shaft 6 and to mount the input shaft 6 to the power transmitting apparatus. However the spline 6b can also be formed in a longitudinal direction from the position in which the supplying ports P1, P2.

According to the first and second embodiments, since the gear stage clutch 3 comprises alternately arranged driving clutch discs 3aa, 3ba and driven clutch discs 3ab, 3bb, hydraulic pistons Pa actuated by hydraulic oil to selectively engage or disengage the driving clutch discs 3aa, 3ba and driven clutch discs 3ab, 3bb, and the power can be transmitted at a predetermined gear ratio with engaging the driving clutch discs 3aa, 3ba with driven clutch discs 3ab, 3bb of the gear stage clutch 3a, 3b of an arbitrary gear stage by selectively supplying hydraulic oil to the hydraulic chambers, it is possible to improve the efficiency of power transmission as compared with the power transmitting apparatus of AT type and to reduce the speed shift time lag as compared with the power transmitting apparatus of AMT type. In addition, since a plurality of the supplying ports P1, P2 are formed on a same plane of a radial cross-section of the input shaft, it is possible to reduce the longitudinal dimension of the input shaft and thus the whole longitudinal dimension of the power transmitting apparatus.

Further according to the first and second embodiments, since the gear stage clutch 3a, 3b of different gear ratios are arranged side by side each other and actuated in common by the hydraulic piston Pa so that the driving clutch discs 3aa, 3ba and the driven clutch discs 3ab, 3bb of the gear stage clutch 3a, 3b of a desired gear ratio are selectively engaged by the hydraulic piston Pa, it is possible to further reduce the longitudinal dimension of the power transmitting apparatus as compared with a power transmitting apparatus in which the hydraulic piston is not used in common both to the gear stage clutches of different gear ratios.

Figure 12:
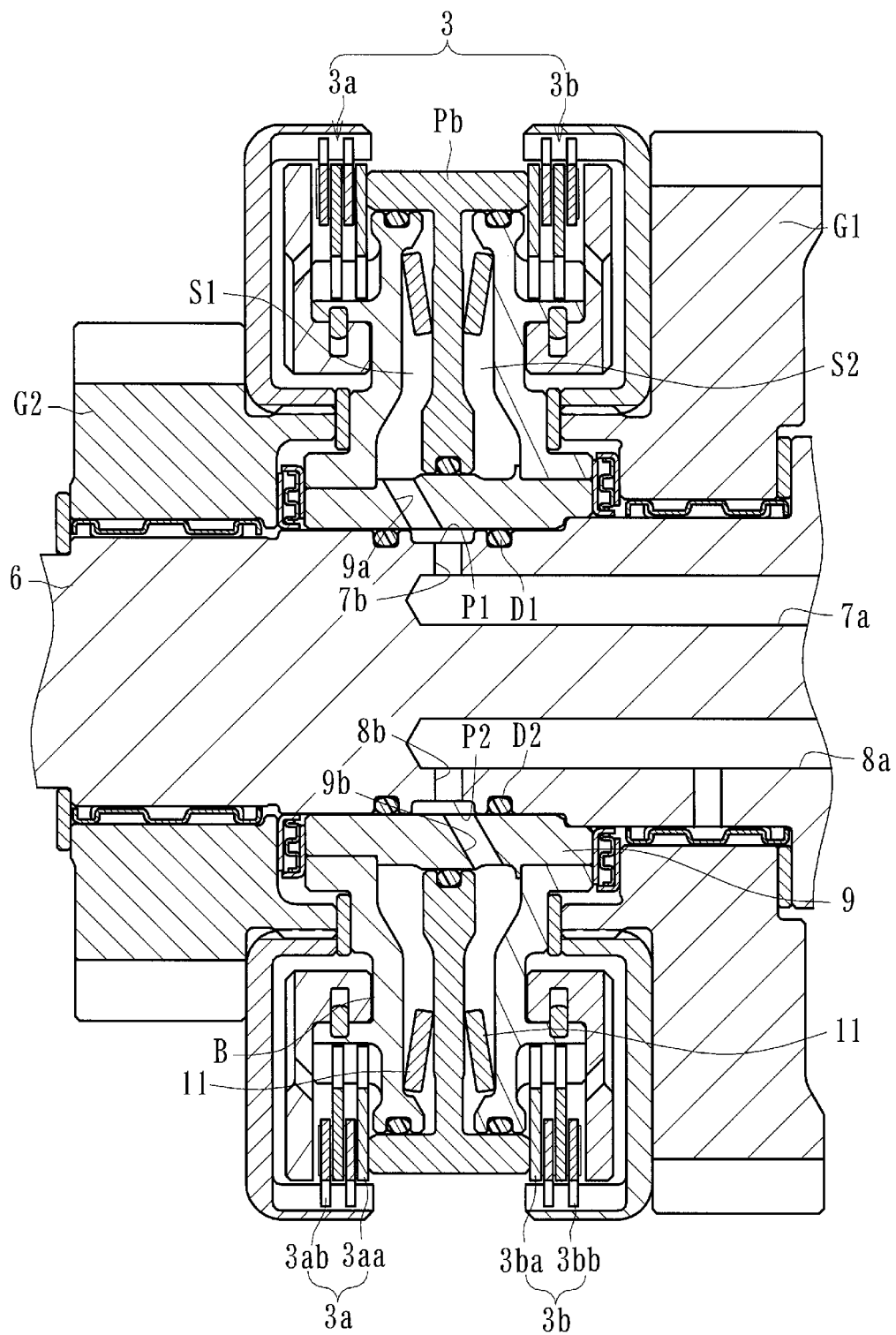
FIG. 12 is a longitudinal section view showing the power transmitting apparatus according to another embodiment of the present invention (having a common hydraulic piston of a large pressurized area)

The present inventions are not limited to that described and shown above. For example, as shown in FIG. 12, it is possible to apply at least one of the present inventions to a power transmitting apparatus in which the piston Pb is commonly used similarly to the first and second embodiments and the pressure receiving area of the piston Pb is increased. In FIG. 12, a reference numeral 11 denotes a Belleville spring for returning the hydraulic piston Pb to its initial position (neutral position) after operation.

Figure 13:
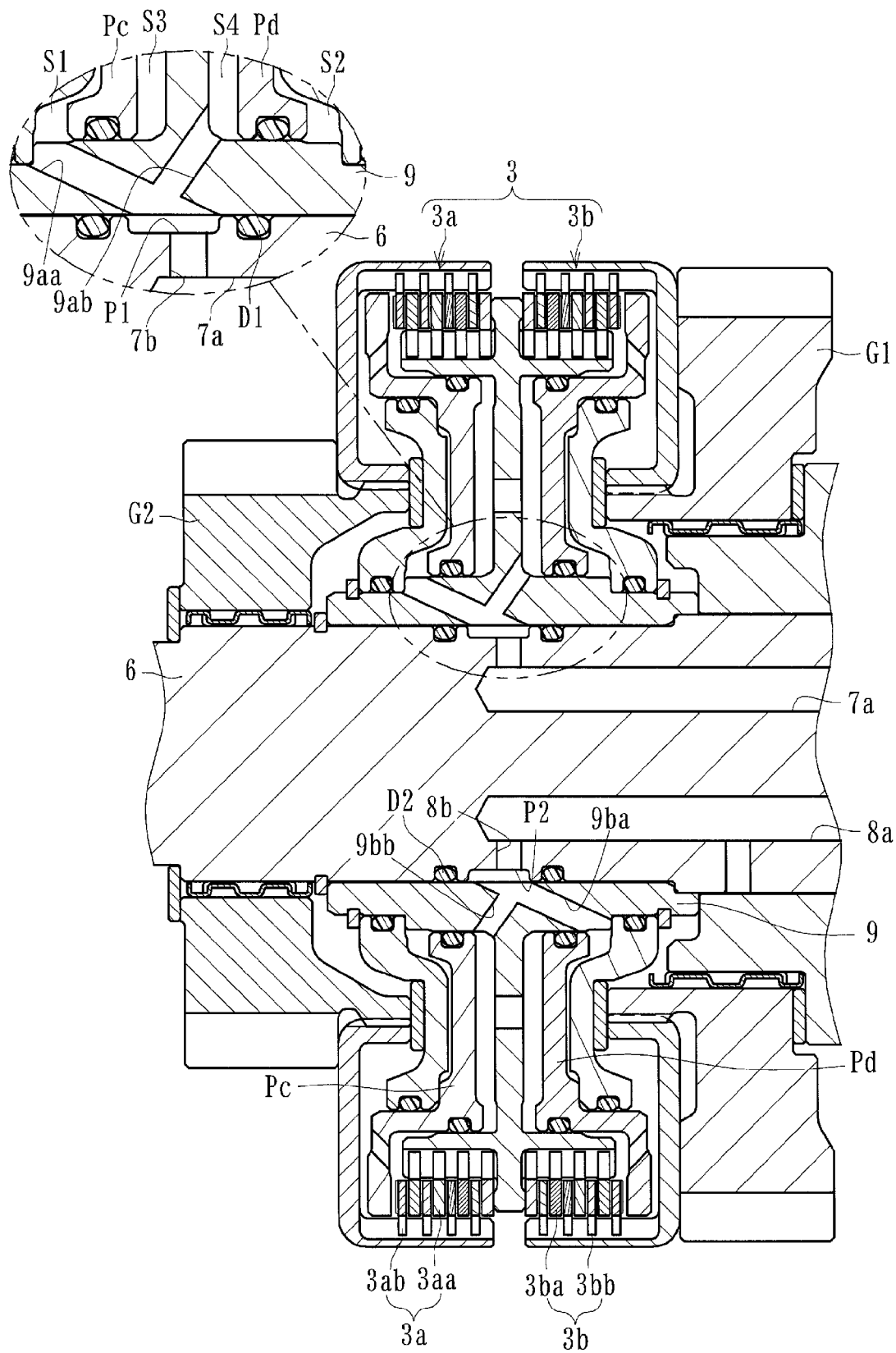
FIG. 13 is a longitudinal section view showing the power transmitting apparatus according to yet another embodiment of the present invention (including a cancelling chamber)

In addition, as shown in FIG. 13, at least one of the present inventions can be applied to a power transmitting apparatus wherein the gear stage clutch 3a, 3b of different gear ratios are arranged side by side each other, wherein cancelling chambers S3, S4 are formed oppositely to the hydraulic chambers S1, S2 of the hydraulic pistons Pc, Pd for disengaging the hydraulic pistons Pc, Pd by hydraulic oil, and wherein the supplying ports P1, P2 communicate both with the hydraulic chamber (S1 or S2) of one of the gear stage clutch 3a or 3b and the cancelling chamber S4 or S3 of the other of the gear stage clutch 3b or 3a.

For example, the supplying port P1 can be communicated both with the hydraulic chamber S1 of the gear stage clutch 3a and with the cancelling chamber S4 of the other gear stage clutch 3b through the oil passages 9aa, 9ab formed in the interlocking member 9, and the supplying port P2 is communicated both with the hydraulic chamber S2 of the gear stage clutch 3b and with the cancelling chamber S3 of the other gear stage clutch 3a through the oil passages 9ba, 9bb formed in the interlocking member 9.

Provision of the cancelling chambers S3, S4 makes it possible to eliminate return springs for returning the hydraulic pistons Pc, Pd to the opposite sides or to use return springs of a smaller spring force. In addition, as shown in FIG. 13, since the pressure receiving areas of the cancelling chamber sides S3, S4 of the hydraulic pistons Pc, Pd are set larger than those of the hydraulic chamber sides S1, S2, it is possible to more surely return the hydraulic pistons Pc, Pd to the opposite sides.

Figure 14:
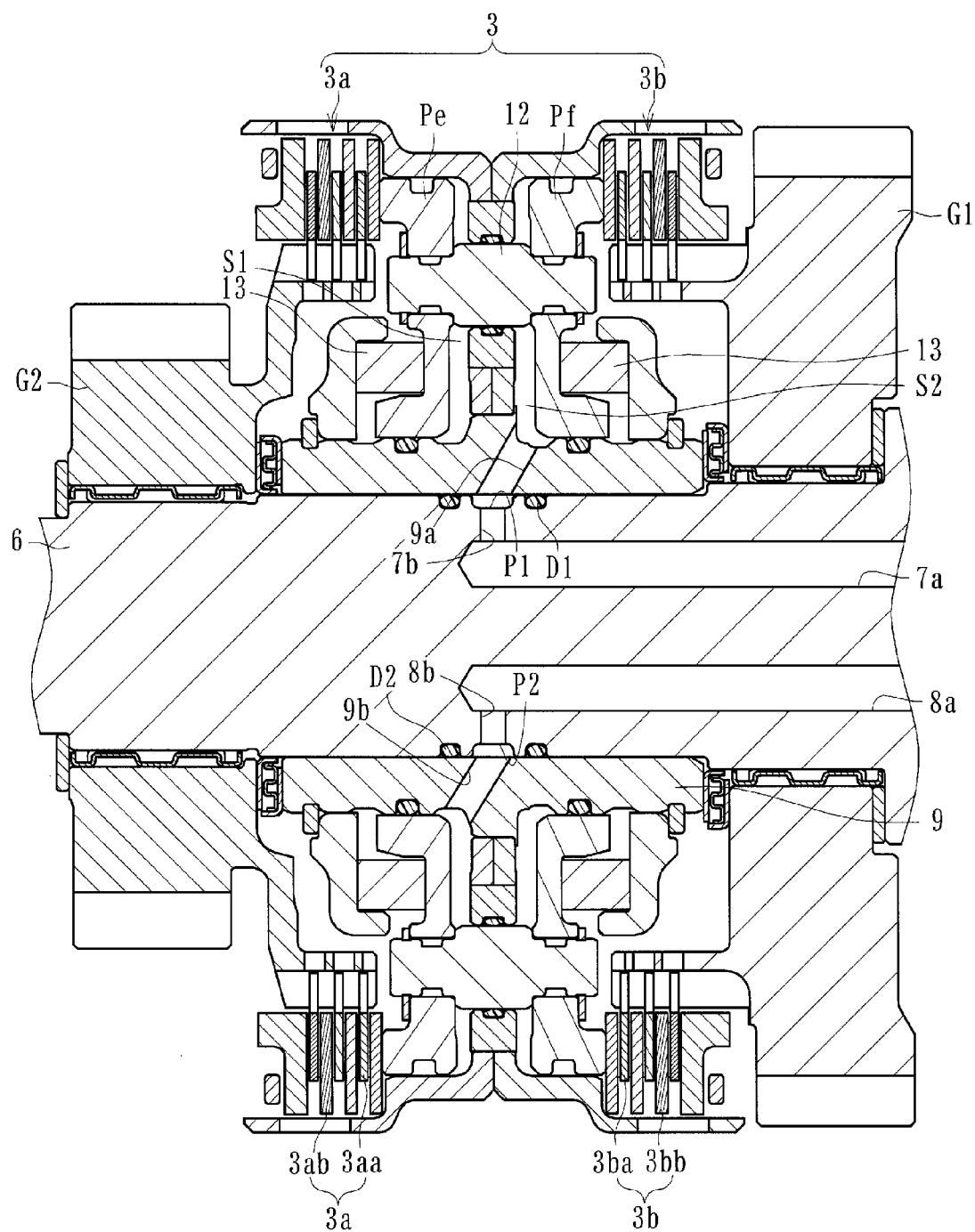
FIG. 14 is a longitudinal section view showing the power transmitting apparatus according to other embodiment of the present invention (including a united hydraulic piston formed by connected hydraulic pistons)
Figure 15:
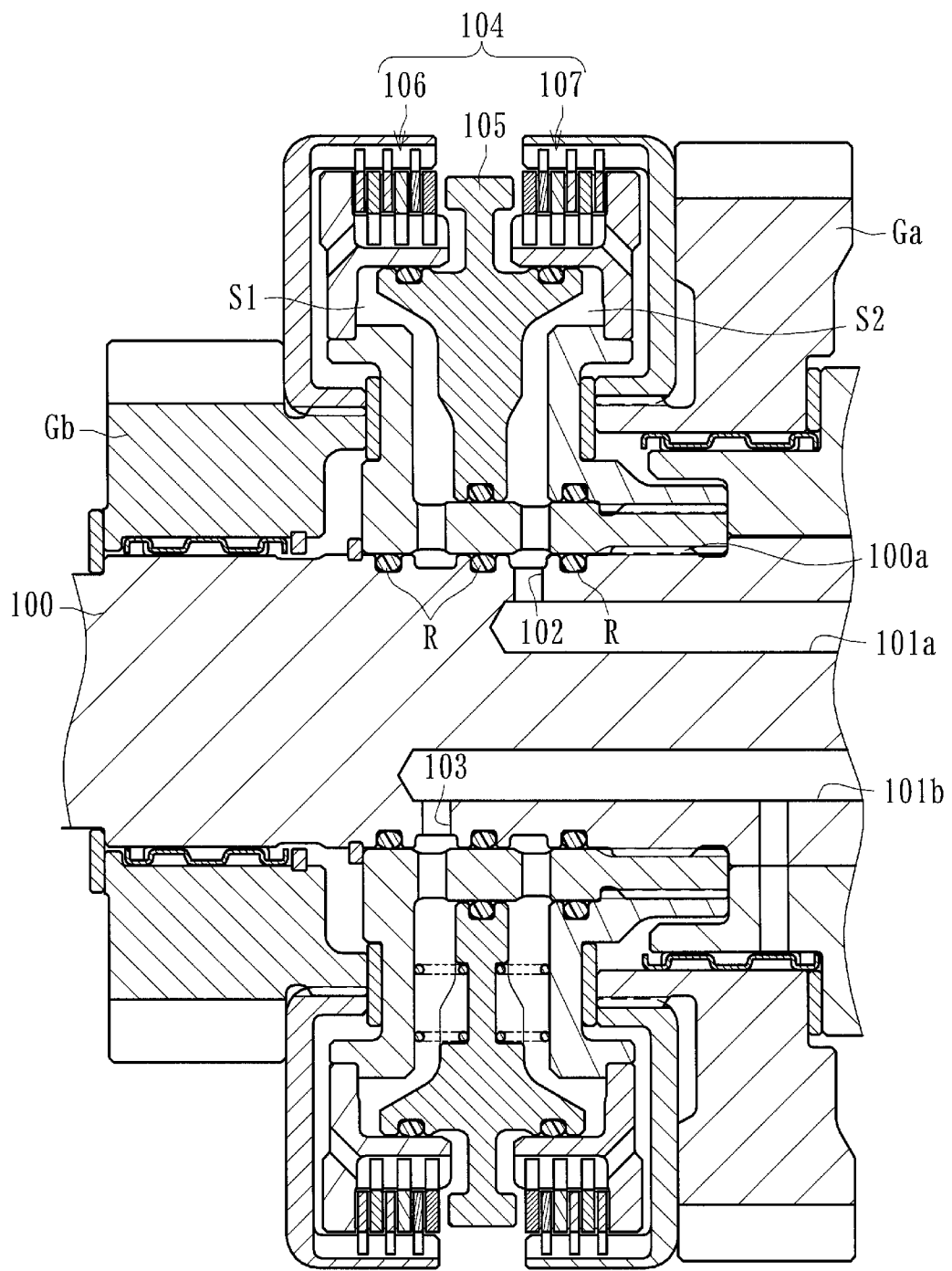
FIG. 15 is a longitudinal section view showing the power transmitting apparatus of the prior art.
Figure 16:
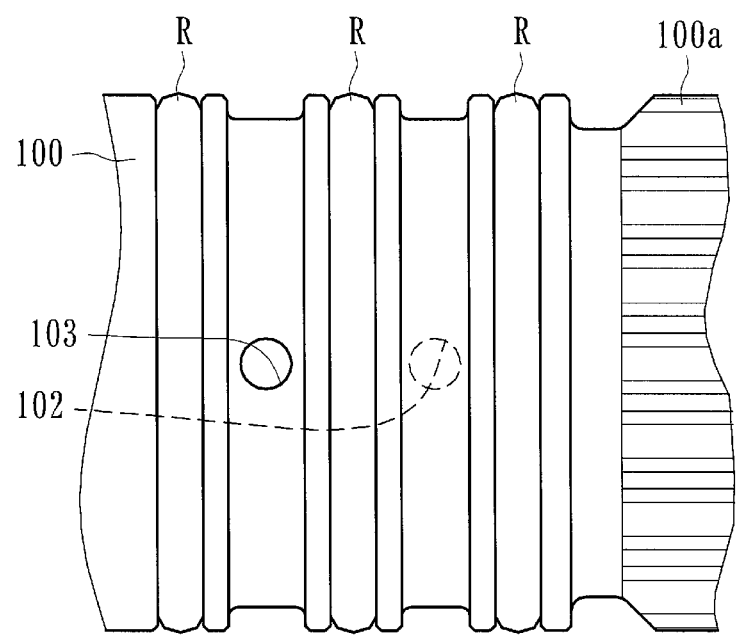
FIG. 16 is an enlarged view showing a portion near the supplying port of the input shaft of the power transmitting apparatus of FIG. 15.

Furthermore, as shown in FIG. 14, at least one of the present inventions can be applied to a power transmitting apparatus wherein gear stage clutch 3a, 3b of different gear ratios are arranged side by side each other and respective hydraulic pistons Pe, Pf are united by connecting member 12. In FIG. 14 a reference numeral 13 denotes springs for returning the united pistons Pe, Pf to the initial position (neutral position). Although it is shown in the illustrated embodiments two supplying ports P1, P2 arranged on a same plane of a radial cross-section of the input shaft 6, three or more supplying ports may be arranged on the same plane of a radial cross-section of the input shaft 6.

One or more of the present inventions can be applied to any power transmitting apparatus in which the power can be transmitted at a predetermined gear ratio with engaging the driving clutch discs with driven clutch discs of the gear stage clutch means of an arbitrary gear stage by selectively supplying hydraulic oil to the hydraulic chambers, and a plurality of the supplying ports are formed on a same plane of a radial cross-section of the input shaft, although it is one having a different external view or the other one to which any other function is added.

What is claimed is:

1. A power transmitting apparatus comprising:
    a plurality of gear stage clutches forming at least part of a power transmitting path between an engine and wheels of a vehicle, an input from an input shaft of an engine side and an output to a wheel side of the gear stage clutches being set at predetermined gear ratios; and
    a gear stage selecting device being configured to select any one of the gear stage clutches in accordance with a running condition of a vehicle and to arbitrarily set the gear ratio during power transmission from the engine to the wheels;
    wherein each of said gear stage clutches comprises alternately arranged driving clutch discs and driven clutch discs, a hydraulic piston actuated by hydraulic oil to selectively engage or disengage the driving clutch discs and driven clutch discs, hydraulic chambers for actuating the hydraulic pistons, and supplying ports communicating with oil passages formed within the input shaft and opening on a side surface of the input shaft for supplying the hydraulic chambers with hydraulic oil from the oil passages to actuate the hydraulic pistons;

wherein power can be transmitted at a predetermined gear ratio by engaging the driving clutch discs with driven clutch discs of the gear stage clutch of an arbitrary gear stage by selectively supplying hydraulic oil to the hydraulic chambers;

wherein a plurality of the supplying ports are formed on a same plane of a radial cross-section of the input shaft, and wherein an annular sealing member is arranged around each of the supplying ports formed on the outer circumferential surface of the input shaft so as to enclose and seal the supplying ports, the sealing member being preformed to have a bent configuration so that it corresponds to a radius of curvature of the outer circumferential surface of the input shaft.

2. The power transmitting apparatus of claim 1, wherein a first sealing member is arranged around one of the supplying ports for sealing it and a second sealing member is arranged around the other of the supplying ports for sealing it, both supplying ports being formed on a same plane of a radial cross-section of the input shaft, and wherein the first and second sealing members are connected each other.

3. The power transmitting apparatus of claim 1, wherein the portion on the outer circumferential surface of the input shaft including said supplying ports is formed with a first spline mating with a second spline of the gear stage clutch for rotating together with the gear stage clutch.

4. The power transmitting apparatus of claim 1, wherein said gear stage clutches of different gear ratios are arranged side by side and actuated in common by the hydraulic piston so that the driving clutch discs and the driven clutch discs of the gear stage clutches of a desired gear ratio are selectively engaged by the hydraulic piston.

5. The power transmitting apparatus of claim 1, wherein said gear stage clutches of different gear ratios are arranged side by side each other, wherein cancelling chambers are formed oppositely to the hydraulic chambers of the hydraulic pistons for disengaging the hydraulic pistons by hydraulic oil, and wherein the supplying ports communicate both with the hydraulic chamber of one of the gear stage clutches and the cancelling chamber of the other of the gear stage clutch.

6. A power transmitting apparatus comprising:

a plurality of gear stage clutches forming at least part of a power transmitting path between an engine and wheels of a vehicle, an input from an input shaft of an engine side and an output to a wheel side of the gear stage clutches being set at predetermined gear ratios; and a gear stage selectin device being configured to select an one of the gear stage clutches in accordance with a running condition of a vehicle and to arbitrarily set the gear ratio during power transmission from the engine to the wheels;

wherein each of said gear stage clutches comprises alternately arranged driving clutch discs and driven clutch discs, a hydraulic piston actuated by hydraulic oil to selectively engage or disengage the driving clutch discs and driven clutch discs, hydraulic chambers for actuating the hydraulic pistons, and supplying ports communicating with oil passages formed within the input shaft and opening on a side surface of the input shaft for supplying the hydraulic chambers with hydraulic oil from the oil passages to actuate the hydraulic pistons;

wherein power can be transmitted at a predetermined gear ratio by engaging the driving clutch discs with driven clutch discs of the gear stage clutch of an arbitrary gear stage by selectively supplying hydraulic oil to the hydraulic chambers;

wherein a plurality of the supplying ports are formed on a same plane of a radial cross-section of the input shaft, and wherein an annular sealing member is arranged around each of the supplying ports formed on the outer circumferential surface of the input shaft so as to enclose and seal the supplying ports, the first sealing member being arranged around one of the supplying ports for sealing it and a second sealing member is arranged around the other of the supplying ports for sealing it, both supplying ports being formed on a same plane of a radial cross-section of the input shaft, and wherein the first and second sealing members are connected each other.

7. The power transmitting apparatus of claim 6, wherein the portion on the outer circumferential surface of the input shaft including said supplying ports is formed with a first spline mating with a second spline of the gear stage clutch for rotating together with the gear stage clutch.

8. The power transmitting apparatus of claim 6, wherein said gear stage clutches of different gear ratios are arranged side by side and actuated in common by the hydraulic piston so that the driving clutch discs and the driven clutch discs of the gear stage clutches of a desired gear ratio are selectively engaged by the hydraulic piston.

9. The power transmitting apparatus of claim 6, wherein said gear stage clutches of different gear ratios are arranged side by side each other, wherein cancelling chambers are formed oppositely to the hydraulic chambers of the hydraulic pistons for disengaging the hydraulic pistons by hydraulic oil, and wherein the supplying ports communicate both with the hydraulic chamber of one of the gear stage clutches and the cancelling chamber of the other of the gear stage clutch.

* * * * *

UNITED STATES PATENT AND TRADEMARK OFFICE
CERTIFICATE OF CORRECTION

| | | |
|---|---|---|
| PATENT NO. | : 8,424,661 B2 | |
| APPLICATION NO. | : 13/368228 | |
| DATED | : April 23, 2013 | |
| INVENTOR(S) | : Asatsuke et al. | |

It is certified that error appears in the above-identified patent and that said Letters Patent is hereby corrected as shown below:

On the Title Page in the Related U.S. Application Data section (item 63), change "Continuation of application No. PCT/JP2011/063328, filed on Aug. 5, 2010" to --Continuation of application No. PCT/JP2010/063328, filed on Aug. 5, 2010--.

In the Claims:

In column 11 at line 51, In Claim 6, change "selectin" to --selecting--.

In column 11 at line 51, In Claim 6, change "an" to --any--.

Signed and Sealed this
Fifteenth Day of October, 2013

Teresa Stanek Rea
*Deputy Director of the United States Patent and Trademark Office*